Patented June 24, 1941

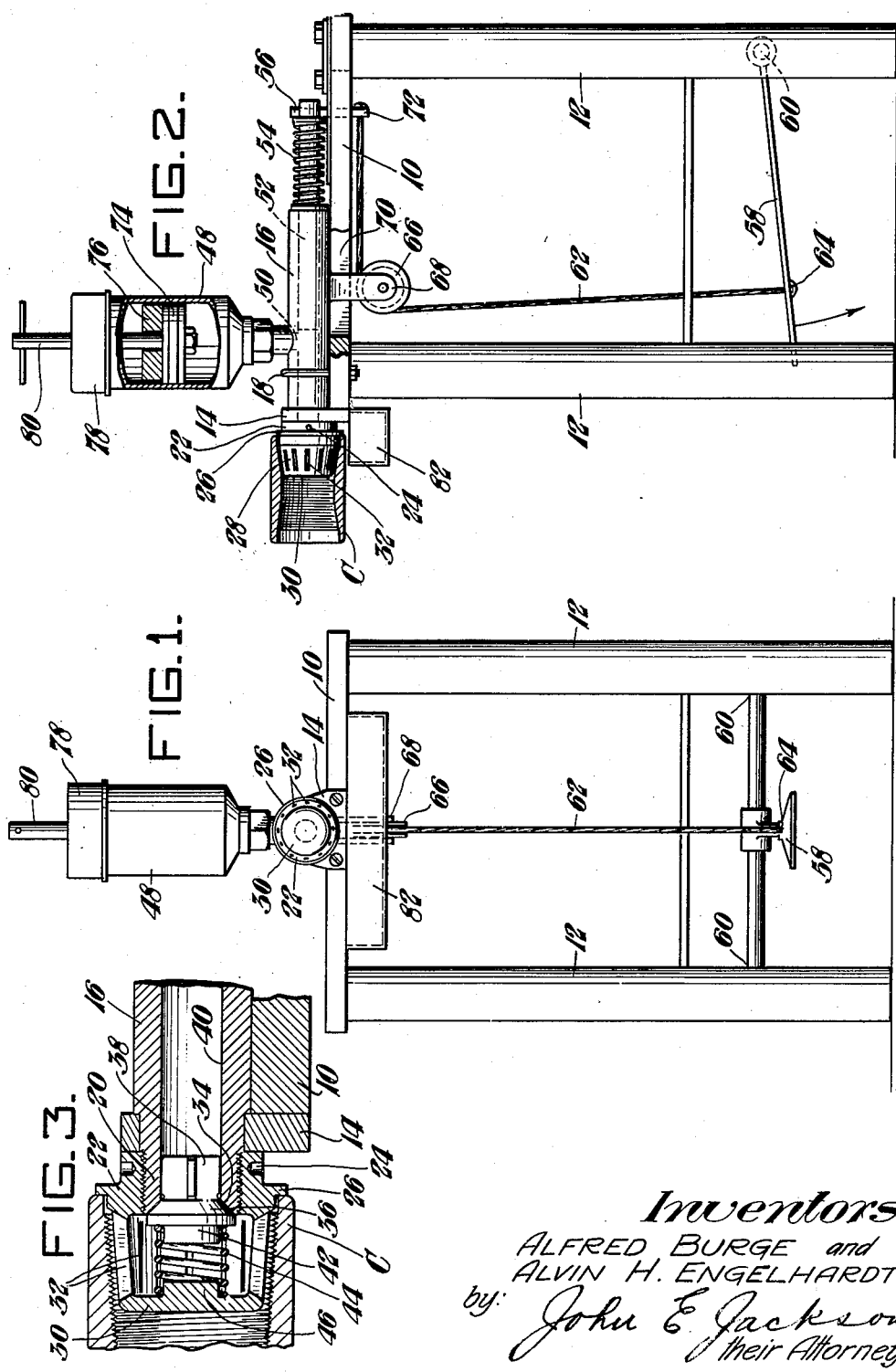

2,246,874

UNITED STATES PATENT OFFICE 2,246,874

GREASING DEVICE FOR THREADED ARTICLES

Alfred Burge, Mount Lebanon, Pa., and Alvin H. Engelhardt, Lorain, Ohio, assignors to National Tube Company, a corporation of New Jersey Application June 27, 1939, Serial No. 281,464

6 Claims. (Cl. 221—47.4)

The present invention relates to improvements in greasing devices peculiarly well suited for distributing grease quite uniformly, both longitudinally and peripherally over the threads of interiorly threaded articles, such as interiorly threaded pipe couplings and fittings.

In applying couplings and similar fittings to the threaded ends of pipe, it is customary to coat both the pipe and the fitting with a thread lubricant before they are screwed up tight to make the permanent joint. Such lubricant frequently consists of a mixture of grease and oil of suitable consistency carrying a filler, such as zinc dust or graphite. One function of the lubricant herein generally referred to as grease, is to seal off any imperfections which may be present in the threads or any voids such as occur in certain types of threads.

Heretofore, in order to completely and properly fill the coupling threads without using an extravagant amount of lubricant, it has been necessary to paint on or apply the grease with a brush. This is a somewhat haphazard and ineffective manner of grease application. To avoid waste, constant supervision has been required.

The device of the present invention aims to eliminate inherent disadvantages in prior practice and to provide a relatively inexpensive yet effective means for uniformly distributing an adequate yet small amount of grease over the periphery of the threads of a coupling or the like for a predetermined length thereof.

The invention will be fully apparent from the following detailed disclosure when read in connection with the accompanying drawing, and will be defined with particularity as required by the patent statutes in the appended claims.

In the drawing—

Figure 1 is an end elevation of a device exemplifying one embodiment of the invention;

Fig. 2 is a side elevation thereof, as viewed from the right, with certain parts shown in section in the interest of clearness; and Fig. 3 is an enlarged longitudinal section of the grease head showing its detachable connection with the cylinder and illustrating the nozzle portion thereof in operative relation to a coupling or similar interiorly threaded article to be greased.

Referring in detail to the drawing, 10 represents a table-like support having legs 12, the support having a forward bracket 14 for engagement with the forward extremity of a grease cylinder 16. A U-bolt 18 in coaction with the bracket 14 serves to rigidly secure the grease cylinder to the table-like support.

At its forward extremity, the cylinder 16 has a screw threaded shank 20 which provides means for detachably securing thereto, a grease head indicated generally at 22. This head is provided with spanner holes 24 to facilitate screwing the head on the shank of the cylinder. The head is provided with an annular flange 26 which serves as an end abutment for the coupling C or other interiorly threaded article to be greased.

Extending forwardly of the flange 26, the grease head is provided with a nozzle 28. This nozzle is of hollow shell-like form and in the embodiment illustrated is slightly tapered to approximately match the taper of the threaded portion of the coupling. In some cases, the nozzle may be cylindrical and it is contemplated that a given piece of equipment may be provided with grease heads having nozzles of different diameters and configurations to suit various practical requirements. The end of the nozzle is closed by a wall 30 and the annular wall thereof is provided with a plurality of elongated laterally opening ports 32 through all of which grease is adapted to be expelled so as to distribute an accurately controlled amount of grease quite uniformly over the interior periphery of the threaded article for a longitudinal length thereof, which is determined approximately by the length of the nozzle ports 32.

The forward extremity of the cylinder 16 is provided with a valve seat 34 for coaction with a valve 36 having guide ribs 38 slidably engaging the interior wall 40 of the cylinder. The opposite end of the valve has a spring centering projection 42 for coaction with a compression spring 44 whose forward end is centered by a lug 46 projecting inwardly from the closed end wall of the nozzle.

A grease reservoir 48 communicates by way of a passage 50 with the interior of the cylinder 16. Mounted for reciprocal movement within the cylinder there is a plunger 52 which is normally held in the retracted position shown, by means of a compression spring 54, the forward end of which bears against a washer loosely mounted on the plunger and the rearward end of which reacts against a pin 56 passing through the plunger.

We preferably provide foot actuated means for imparting a grease feeding movement to the plunger. As illustrated, this means takes the form of a treadle 58 pivoted at 60 to the supporting structure, this treadle being operatively connected with the plunger in such manner that actuation thereof causes a forward reciprocation of the plunger so as to force the grease received from the reservoir past the check valve 36 and outwardly through the discharge ports 32. As shown in the drawing, the connection between the treadle and the plunger comprises a flexible cable 62 secured at 64 to the treadle and passing over a guide sheave 66 which is journalled on a pin carried by a lug 68 extending downwardly from the cylinder 16 through a slot 70 formed in the table-like support, the end of the cable 62 being connected at 72 to the pin 56.

The reservoir is provided with a plunger 74 which is urged downwardly by a weight 76, the same being effective so long as there is grease in the reservoir. When the supply therein becomes depleted, the cap 78 of the reservoir is removed and the plunger is removed by pulling outwardly on a handle 80 secured thereto; whereupon the reservoir is re-filled and the weighted plunger again positioned at the top of the reservoir.

Mounted in juxtaposition to the grease head and below the same, we provide a receptacle 82 which is adapted to catch any excess grease or drip which may be present upon removal of the article being greased.

From the foregoing disclosure, it is apparent that the device provides means whereby couplings and similar interiorly threaded articles can readily have a sufficient amount of grease applied thereto to fill the threads thereof. The device is such that in its operation both hands of the operator are left free. The pressure developed by the operation of the foot treadle is sufficient to completely fill the threads with grease or other lubricant. The flange 26 serves the double function of properly positioning the article to be treated and also preventing the outflow of grease therefrom during treatment.

While we have described quite precisely the details of the embodiment illustrated, it is to be understood that the drawing and detailed description are to be interpreted in an illustrative rather than a limiting sense.

We claim:

1. A device for applying grease to interiorly threaded articles comprising a fixedly positioned grease head having a nozzle adapted to enter said articles, said nozzle having a closed end and being provided with a plurality of elongated laterally opening ports, a cylinder to which the grease head is secured, a yieldable valve between the cylinder and the ports in said nozzle, a grease reservoir communicating with the interior of said cylinder, a plunger slidable in the cylinder adapted to force grease received from said reservoir past said valve and outwardly through the lateral ports in the grease head so as to distribute grease simultaneously over a wide area of the threaded article into which the nozzle projects, means normally tending to withdraw said plunger, and means acting contrary thereto for imparting a grease expelling movement to the plunger.

2. A device for applying grease to the screw threads of interiorly threaded articles comprising a fixedly mounted grease head with an annular flange formed thereon for engagement with the ends of such articles, a nozzle portion on the grease head positioned in advance of said flange, said nozzle being of hollow formation and the outer extremity thereof being a closed wall, said nozzle including an annular wall with a plurality of elongated ports extending laterally therethrough to provide for discharge of grease at a plurality of points around the periphery thereof, a cylinder to which said nozzle is detachably secured, a spring pressed check valve arranged to permit flow of grease from the cylinder into and through the nozzle, a grease reservoir communicating with said cylinder, a plunger slidable within said cylinder and effective to force grease received from said reservoir past said check valve and laterally outward through said ports, and means for imparting grease feeding movement to said plunger.

3. A device for applying grease to the screw threads of interiorly threaded articles comprising a grease head with an annular flange formed thereon for engagement with the ends of such articles, a nozzle portion on the grease head positioned in advance of said flange, said nozzle being of hollow formation and the outer extremity thereof being a closed wall, said nozzle including an annular wall with a plurality of elongated ports extending laterally therethrough to provide for a discharge of grease at a plurality of elongated areas around the periphery thereof, a cylinder to which said nozzle is detachably secured, a spring pressed check valve arranged to permit flow of grease from the cylinder into and through the nozzle, a grease reservoir communicating with said cylinder, a plunger slidable within said cylinder and effective to force grease received from said reservoir past said check valve and laterally outward through said ports, means tending to retract said plunger, and a manually actuated treadle operatively connected with the plunger effective to impart a grease feeding movement thereto.

4. A device for applying grease to interiorly threaded couplings or the like comprising a grease head having a hollow nozzle with a closed end wall and a plurality of spaced laterally opening ports in the peripheral wall thereof, a cylinder to the end of which the nozzle is detachably secured, a spring pressed check valve adapted to yield to permit flow of grease from the cylinder into and through the nozzle, a grease reservoir connected by a passageway with the interior of the cylinder, means in the reservoir effective to force grease therefrom into the cylinder, a plunger slidable in the cylinder, means tending to retract the plunger to a point beyond the connection between the cylinder and the reservoir, and manually operable means for imparting a grease expelling movement to the plunger.

5. The device of claim 4 wherein the cylinder is mounted on a fixed table-like structure and including a manually operable treadle pivotally supported by said structure including connections for transmitting movement from the treadle to said plunger.

6. The device of claim 4 wherein the cylinder is mounted on a fixed table-like structure and including a manually operable treadle pivotally supported by said structure including connections for transmitting movement of the treadle to said plunger, and means supported by the table-like structure in juxtaposition to the nozzle adapted to receive the drip or excess grease upon disengagement of the work from the nozzle.

ALFRED BURGE.
ALVIN H. ENGELHARDT.